(12) United States Patent
Yoshihara et al.

(10) Patent No.: US 11,401,885 B2
(45) Date of Patent: Aug. 2, 2022

(54) ENGINE UNIT

(71) Applicant: TOYOTA JIDOSHA KABUSHIKI KAISHA, Aichi-ken (JP)

(72) Inventors: Masatomo Yoshihara, Toyota (JP); Taejin Yoon, Toyota (JP); Naoki Hayashima, Toyota (JP); Masanao Idogawa, Nagoya (JP); Takahiro Uchida, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/357,995

(22) Filed: Jun. 25, 2021

(65) Prior Publication Data
US 2022/0018305 A1    Jan. 20, 2022

(30) Foreign Application Priority Data

Jul. 16, 2020   (JP) .............................. JP2020-121944

(51) Int. Cl.
| | |
|---|---|
| *F02D 41/40* | (2006.01) |
| *F02P 5/15* | (2006.01) |
| *F02D 41/06* | (2006.01) |
| *F02D 41/00* | (2006.01) |

(52) U.S. Cl.
CPC ......... *F02D 41/402* (2013.01); *F02D 41/009* (2013.01); *F02D 41/065* (2013.01); *F02P 5/1506* (2013.01)

(58) Field of Classification Search
CPC .... F02D 41/402; F02D 41/009; F02D 41/065; F02P 5/1506
See application file for complete search history.

(56) References Cited

U.S. PATENT DOCUMENTS

| | | | | |
|---|---|---|---|---|
| 5,207,058 | A * | 5/1993 | Sasaki | F02D 41/405 60/284 |
| 5,482,017 | A * | 1/1996 | Brehob | F02D 41/0255 123/299 |
| 5,483,017 | A * | 1/1996 | Keller | C08G 77/56 528/5 |
| 6,073,606 | A * | 6/2000 | Shimizu | F02D 41/3064 123/295 |
| 10,968,845 | B2 * | 4/2021 | Ohura | F02D 41/402 |
| 2005/0161020 | A1 * | 7/2005 | Tomita | F02D 37/02 123/305 |

(Continued)

FOREIGN PATENT DOCUMENTS

| | | | | |
|---|---|---|---|---|
| EP | 0838584 A2 * | 4/1998 | ........... | F02D 41/405 |
| JP | 2018131948 A | 8/2018 | | |

*Primary Examiner* — Joseph J Dallo
(74) *Attorney, Agent, or Firm* — Hauptman Ham, LLP

(57) ABSTRACT

An engine unit includes an engine including a cylinder injection valve that sprays fuel into a combustion chamber and an ignition plug that is able to ignite fuel sprayed from the cylinder injection valve. When expansion stroke injection drive of performing final fuel injection from the cylinder injection valve in an expansion stroke and igniting the fuel using the ignition plug in synchronization with the fuel injection in the expansion stroke is performed, upper and lower limits of an ignition timing are guarded such that the ignition timing is in a predetermined range centered on a final fuel injection start timing at a final determination timing of the ignition timing.

5 Claims, 2 Drawing Sheets

(56) References Cited

U.S. PATENT DOCUMENTS

| | | | | |
|---|---|---|---|---|
| 2007/0034188 A1* | 2/2007 | Duffy | ............... | F02D 41/402 |
| | | | | 123/299 |
| 2007/0227503 A1* | 10/2007 | Hitomi | ............... | F02D 41/0002 |
| | | | | 123/406.45 |
| 2008/0022958 A1* | 1/2008 | I | ............... | F02D 41/06 |
| | | | | 123/179.3 |
| 2009/0125212 A1* | 5/2009 | Kurashima | ............... | F02D 41/402 |
| | | | | 701/103 |
| 2014/0172219 A1* | 6/2014 | Nakanishi | ............... | F02N 19/005 |
| | | | | 701/22 |
| 2016/0153390 A1* | 6/2016 | Ranga | ............... | F02D 41/2438 |
| | | | | 701/104 |
| 2018/0163687 A1* | 6/2018 | Tanaka | ............... | F02D 37/02 |

\* cited by examiner

ENGINE UNIT

CROSS-REFERENCE TO RELATED APPLICATION

This application claims priority to Japanese Patent Application No. 2020-121944 filed on Jul. 16, 2020, incorporated herein by reference in its entirety.

BACKGROUND

1. Technical Field

The present disclosure relates to an engine unit and more particularly to an engine unit for a vehicle.

2. Description of Related Art

In the related art, as such a type of engine unit, an engine unit including an engine including a cylinder injection valve that injects fuel into a combustion chamber and an ignition plug that is provided in the vicinity of a top of the combustion chamber has been proposed (for example, see Japanese Unexamined Patent Application Publication No. 2018-131948 (JP 2018-131948 A)). In this engine unit, when occurrence of knocking is detected during operation in a combustion mode in which fuel is injected from the cylinder injection valve in a compression stroke, a stratified air-fuel mixture is formed in the vicinity of the ignition plug, and stratified combustion is performed, an ignition timing is delayed. When an amount of delay of a fuel injection timing based on the ignition timing is less than a reference amount, injection of fuel in a compression stroke is performed at the injection timing which is delayed by the amount of delay.

SUMMARY

In an engine unit including a cylinder injection valve, injecting a majority of an amount of fuel determined based on a load factor of an engine or the like one time or a plurality of times in an intake stroke or a compression stroke, performing final injection of fuel in an expansion stroke, and igniting the fuel by an ignition plug in synchronization with the final injection of fuel can also be considered. At the time of restarting of the engine after idling stop, it is necessary to quickly start the engine, and performing the final injection of fuel and the ignition in the expansion stroke and returning a fuel injection timing and an ignition timing to normal timings after the starting such that a driver or an occupant does not feel uncomfortable due to vibration based on starting of the engine or the like can also be considered. In this case, since the final fuel injection timing or the ignition timing varies with a change in an operating state of the engine unit in response to an operator's operation, fuel injection and ignition may not be synchronized with each other well and good combustion is hindered.

The present disclosure provides an engine unit that can prevent a fuel injection timing and an ignition timing from not being synchronized when fuel injection and ignition are performed in an expansion stroke.

An engine unit according to the present disclosure employs the following means.

An engine unit for a vehicle according to an aspect of the present disclosure includes: an engine including a cylinder injection valve that sprays fuel into a combustion chamber and an ignition plug that is able to ignite fuel sprayed from the cylinder injection valve; and a control device configured to control a plurality of fuel injections using the cylinder injection valve and ignition using the ignition plug. When expansion stroke injection drive of performing final fuel injection from the cylinder injection valve in an expansion stroke and igniting the fuel using the ignition plug in synchronization with the fuel injection in the expansion stroke is performed, the control device is configured to perform ignition timing adjustment control for guarding upper and lower limits of an ignition timing such that the ignition timing is in a predetermined range centered on a final fuel injection start timing at a final determination timing of the ignition timing.

In the engine unit according to the present disclosure, when expansion stroke injection drive of performing final fuel injection from the cylinder injection valve in an expansion stroke and igniting the fuel using the ignition plug in synchronization with the fuel injection in the expansion stroke is performed, ignition timing adjustment control for guarding upper and lower limits of an ignition timing is performed such that the ignition timing is in a predetermined range centered on a final fuel injection start timing at a final determination timing of the ignition timing. Accordingly, the ignition timing can be set to be in a predetermined range centered on the final fuel injection start timing and can be prevented from departing from the predetermined range. By using a range in which the final fuel injection and the ignition timing can be synchronized with each other as the predetermined range, it is possible to prevent the fuel injection timing and the ignition timing from not being synchronized with each other when the fuel injection and the ignition are performed in the expansion stroke. The ignition timing adjustment control may be performed when the expansion stroke injection drive is performed at the time of normal starting of the engine instead of a timing after idling stop.

Here, the "final determination timing" may be a control cycle timing closest to a timing before the compression top dead center. The control cycle timing also includes a timing at intervals of a predetermined crank angle as well as a timing at intervals of a predetermined time. For example, when a timing at intervals of a crank angle of 30 degrees is used, the final determination timing is a timing of a crank angle of 30 degrees before the compression top dead center. The "predetermined range" may be a range from the final fuel injection start timing to a timing after a predetermined crank angle. For example, a range from the final fuel injection start timing to a timing delayed by a crank angle of 3 degrees, 4 degrees, or 5 degrees may be used as the predetermined range.

In the engine unit according to the present disclosure, the control device may be configured to set the final fuel injection start timing and the ignition timing using the same parameters. With this configuration, it is possible to prevent the ignition timing from departing from the predetermined range centered on the final fuel injection start timing. At least some of an acceleration request history, a shift position, a torque required for the engine, and a temperature of a coolant of the engine can be used as the parameters.

In the engine unit according to the present disclosure, the control device may be configured to perform the final fuel injection and advancing of the ignition timing by divided change when the expansion stroke injection drive transitions to normal drive in which the final fuel injection from the cylinder injection valve is performed up to a compression stroke. With this configuration, it is possible to curb sudden change of a torque of the engine.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the accompanying drawings.

Figure 1:
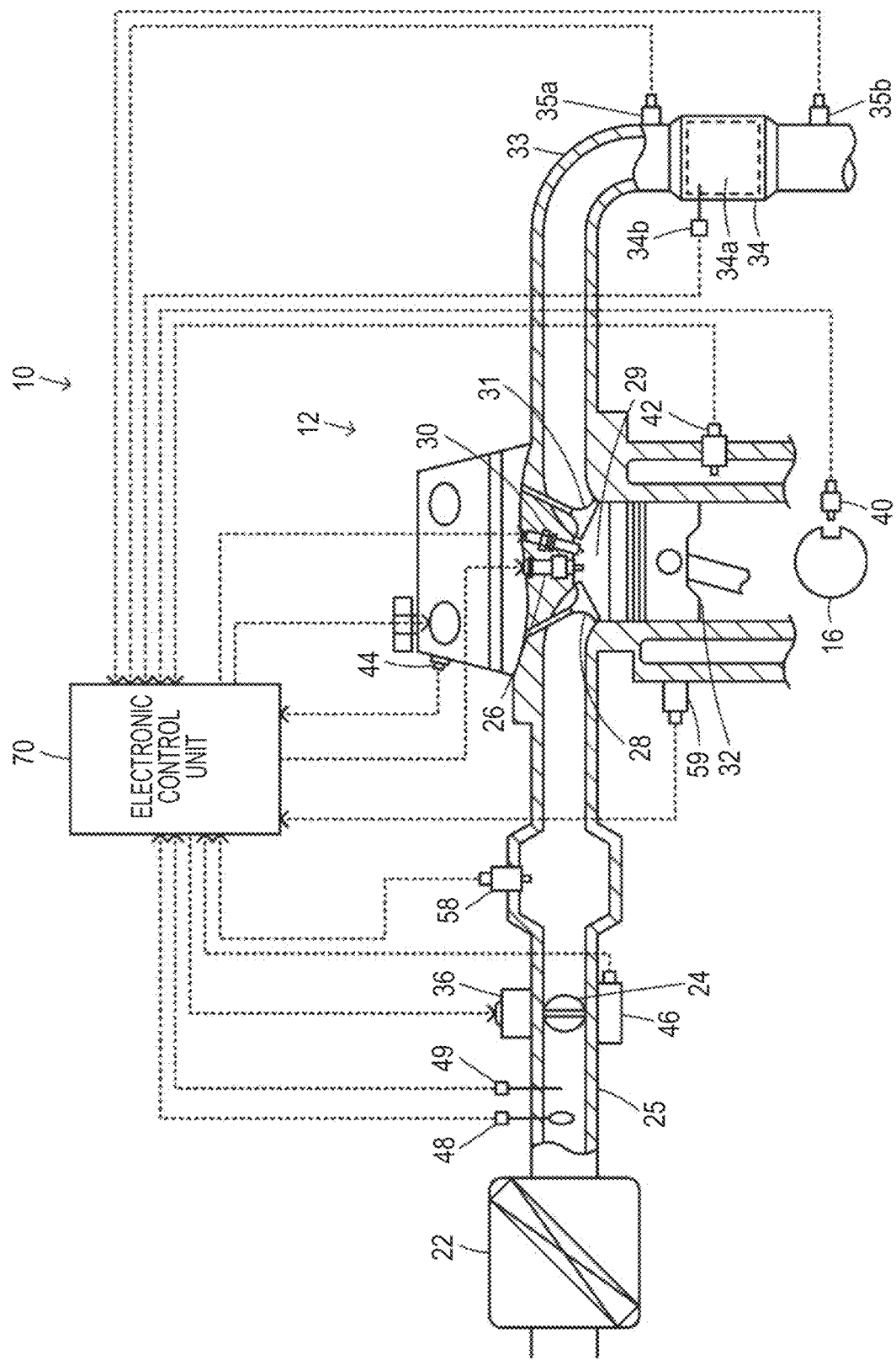
FIG. 1 is a diagram schematically illustrating a configuration of an engine unit 10 according to an embodiment of the present disclosure.

FIG. 1 is a diagram schematically illustrating a configuration of an engine unit 10 according to an embodiment of the present disclosure. As illustrated in the drawing, the engine unit 10 according to the embodiment includes an engine 12 and an electronic control unit (hereinafter referred to as "ECU") 70 that controls the engine 12. The engine unit 10 is mounted in a vehicle that travels using only power from the engine 12, a hybrid vehicle that includes a motor in addition to the engine 12, or the like.

The engine 12 is configured as an internal combustion engine that outputs power using fuel such as gasoline or diesel oil through four strokes including intake, compression, expansion, and exhaust strokes. The engine 12 includes a cylinder injection valve 26 that injects fuel into a cylinder and an ignition plug 30. The cylinder injection valve 26 is disposed substantially at the center of a top of a combustion chamber 29 and injects fuel in a spray manner. The ignition plug 30 is disposed in the vicinity of the cylinder injection valve 26 such that fuel which is injected in a spray manner from the cylinder injection valve 26 can be ignited. The engine 12 takes air cleaned by an air cleaner 22 into the combustion chamber 29 via an intake pipe 25, injects fuel from the cylinder injection valve 26 in an intake stroke or a compression stroke one time or a plurality of times, explosively combusts the fuel using electric sparks from the ignition plug 30, and converts a reciprocating motion of a piston 32 which is pressed by the explosive combustion energy to a rotational motion of a crank shaft 16.

Exhaust gas which is discharged from the combustion chamber 29 of the engine 12 to an exhaust pipe 33 is discharged to the outside air via a cleaning device 34 including a cleaning catalyst (three-way catalyst) 34a that removes harmful components such as carbon monoxide (CO), hydrocarbon (HC), and nitrogen oxide (NOx).

Although not illustrated, the ECU 70 is configured as a microprocessor including a CPU as a core and includes a ROM that stores a processing program, a RAM that temporarily stores data, and input and output ports in addition to the CPU. Signals from various sensors required for controlling the engine 12 are input to the ECU 70 via the input port. Examples of the signals input to the ECU 70 include a crank angle θcr from a crank position sensor 40 that detects a rotational position of the crank shaft 16, a coolant temperature Tw from a coolant temperature sensor 42 that detects a temperature of a coolant in the engine 12, and cam angles θci and θco from a cam position sensor 44 that detects a rotational position of an intake cam shaft for opening and closing an intake valve 28 and a rotational position of an exhaust cam shaft for opening and closing an exhaust valve 31. Examples of such signals further include a throttle opening degree TH from a throttle valve position sensor 46 that detects a position of a throttle valve 24 provided in the intake pipe 25, an amount of intake air Qa from an air flowmeter 48 that is attached to the intake pipe 25, an intake air temperature Ta from a temperature sensor 49 that is attached to the intake pipe 25, and an intake air pressure Pin from an intake air pressure sensor 58 that detects a pressure in the intake pipe 25. Examples of such signals further include a catalyst temperature Tc from a temperature sensor 34b that detects a temperature of the cleaning catalyst 34a of the cleaning device 34, an air-fuel ratio AF from an air-fuel ratio sensor 35a that is attached to an exhaust pipe 33, an oxygen signal O2 from an oxygen sensor 35b that is attached to the exhaust pipe 33, and a knocking signal Ks from a knocking sensor 59 that is attached to a cylinder block and detects vibration which is generated with occurrence of knocking.

Various control signals for controlling the engine 12 are output from the ECU 70 via the output port. Examples of the control signals output from the ECU 70 include a drive control signal for the a throttle motor 36 that adjusts the position of the throttle valve 24, a drive control signal for the cylinder injection valve 26, and a drive control signal for the ignition plug 30.

The ECU 70 calculates a rotation speed of the crank shaft 16, that is, a rotation speed Ne of the engine 12, based on the crank angle θcr from the crank position sensor 40. The ECU 70 also calculates charging efficiency KL as a load of the engine 12 (a ratio of an air mass actually input in one cycle to a stroke volume in one cycle of the engine 12) based on the amount of intake air Qa from the air flowmeter 48 and the rotation speed Ne of the engine 12.

In the engine unit 10 having the aforementioned configuration, the ECU 70 performs intake air amount control, fuel injection control, and ignition control of the engine 12 such that the engine 12 operates based on a target rotation speed Ne* and a target torque Te*. In the intake air amount control, the ECU 70 sets a target amount of intake air Qa* based on the target torque Te* of the engine 12, sets a target throttle opening degree TH* such that amount of intake air Qa reaches the target amount of intake air Qa*, and controls the throttle motor 36 such that the throttle opening degree TH of the throttle valve 24 reaches the target throttle opening degree TH*. In the fuel injection control, the ECU 70 sets a target amount of injected fuel Qfd* of the cylinder injection valve 26 such that the air-fuel ratio AF reaches a target air-fuel ratio AF* (for example, a stoichiometric air-fuel ratio) based on the rotation speed Ne and the charging efficiency KL of the engine 12 and controls the cylinder injection valve 26 such that fuel corresponding to the target amount of injected fuel Qfd* is injected from the cylinder injection valve 26 one time or a plurality of times. In the ignition control, the ECU 70 sets a target ignition timing Tp* based on the rotation speed Ne and the charging efficiency KL of the engine 12 and controls ignition of the ignition plug 30.

The operation of the engine unit 10 having the aforementioned configuration according to this embodiment, particularly, the operation at the time of expansion stroke injection drive of performing final fuel injection in an expansion stroke and igniting fuel in synchronization with the fuel injection in the expansion stroke, will be described below. The expansion stroke injection drive is performed, for example, at the time of restarting of the engine 12 after idling stop. At the time of restarting of the engine 12 after idling stop, it is necessary to quickly start the engine 12 and to prevent a driver or an occupant from feeling uncomfortable due to vibration at the time of starting of the engine 12 or the like. Accordingly, the expansion stroke injection drive in which vibration is curbed due to a small output torque is performed at the time of restarting of the engine 12 after idling stop.

In the expansion stroke injection drive, since an amount of injected fuel of the fuel injection (final fuel injection) in the expansion stroke has only to be an amount which can cause effective discharge attraction for ignition of the ignition plug 30, a small fixed value or a predetermined small value which is determined based on the charging efficiency KL is used. An amount of injected fuel in first or second fuel injection other than the final fuel injection can be calculated by multiplying a division ratio by a value obtained by subtracting the amount of injected fuel in the final fuel injection from the target amount of injected fuel Qfd*.

Regarding a fuel injection timing, when the stop position of the engine 12 is equal to or greater than a predetermined crank angle (for example, 130 degrees or 150 degrees) before a compression top dead center TDC in a cylinder in which the stop position first becomes the compression top dead center TDC in initial explosion at the time of starting of the engine 12, BTDC110 (Before TDC 110°: which may be abbreviated as B110), BTDC120, or the like can be used as a first fuel injection start timing in the cylinder, BTDC90, BTDC80, or the like can be used as a second fuel injection start timing, and ATDC20 (After TDC 20°: which may be abbreviated as A20) or the like can be used as a final fuel injection start timing (an expansion stroke injection start timing) Tfbs. Regarding the fuel injection timing in a cylinder in which the stop position second becomes the compression top dead center TDC, when the stop position of the engine 12 is less than a predetermined crank angle before the compression top dead center TDC in the cylinder in which the stop position first becomes the compression top dead center TDC, BTDC110, BTDC120, or the like can be used as the first fuel injection start timing, BTDC90, BTDC80, or the like can be used as the second fuel injection start timing, and ATDC20 or the like can be used as an expansion stroke injection start timing Tfbs (the final fuel injection start timing). The fuel injection timing in initial explosion at the time of starting of the engine 12 can be preferably determined based on the stop position of the engine 12. In a cylinder after the initial explosion, fuel injection is performed one time or a plurality of times in the intake stroke or the compression stroke depending on the operating state of the engine 12 and fuel injection is performed as the final fuel injection in the expansion stroke. The fuel injection timing in this case is determined using, as parameters, at least some of an acceleration request history, whether a shift position Sp at that time is a traveling position (a D position or an R position) or a non-traveling position (a P position or an N position), a target torque Te* which is a required torque for the engine 12, and a coolant temperature Tw of the engine 12. For example, with respect to ATDC20 or the like, the expansion stroke injection start timing Tfbs is set to a slightly advanced side when the acceleration request history indicates that the vehicle has often accelerated relatively quickly immediately after starting of the engine 12 more than when the vehicle has less often accelerated, is set to a slightly advanced side when the shift position Sp is a traveling position more than when the shift position Sp is a non-traveling position, is set to a slight delayed side when the target torque Te* is great more than when the target torque Te* is small, and is set to a slightly delayed side when the coolant temperature Tw of the engine 12 is high more than when the coolant temperature Tw is low. The expansion stroke injection start timing Tfbs is basically set before the first fuel injection start timing and may change slightly depending on the operating state of the engine 12 thereafter.

Figure 2:
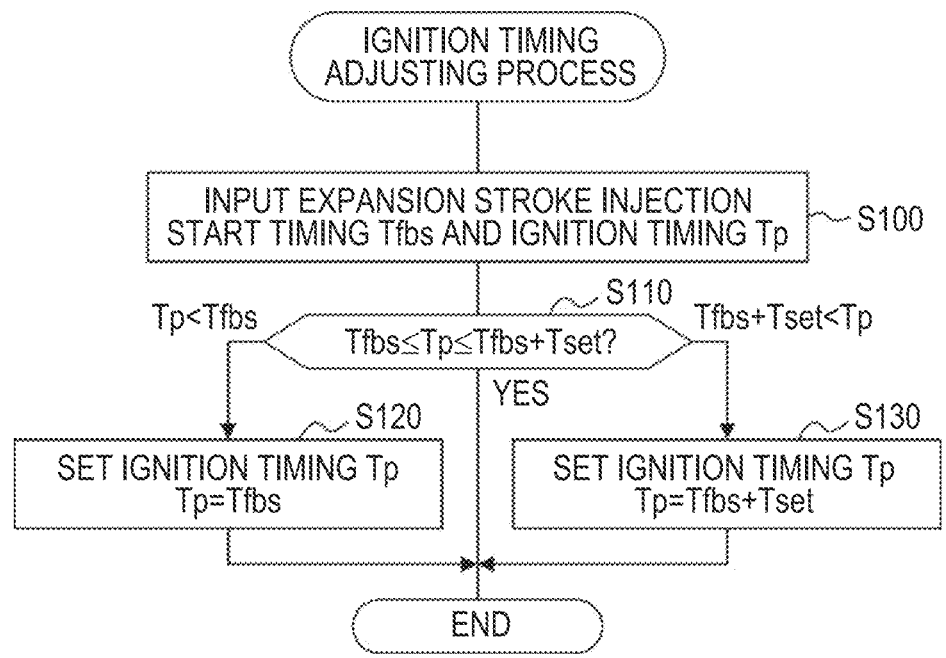
FIG. 2 is a flowchart illustrating an example of an ignition timing adjusting routine which is performed by an ECU 70.

Basically, at the same time as the fuel injection start timing or slightly prior thereto, the ignition timing Tp is determined with respect to ATDC20 or the like in the same way as determining the expansion stroke injection start timing Tfbs using the same parameters as the parameters (the acceleration request history, the shift position Sp, the target torque Te*, the coolant temperature Tw, and the like) which are used to set the fuel injection start timing. The ignition timing Tp is changed with a change of the operating state of the engine 12 based on a driver's operation after it has been set. For example, the ignition timing Tp is changed to the delayed side when a driver depresses an accelerator pedal and thus the charging efficiency KL increases, and is changed to the advanced side when the rotation speed Ne of the engine 12 decreases. The final determination timing of the ignition timing Tp is BTDC30 or the like in this embodiment. At this time, an ignition timing adjusting process illustrated in FIG. 2 is performed to finally set the ignition timing Tp and fuel is ignited by the ignition plug 30 at the set timing.

In the ignition timing adjusting process, an expansion stroke injection start timing Tfbs and an ignition timing Tp are input (Step S100), and it is determined whether the ignition timing Tp is in a predetermined range centered on the expansion stroke injection start timing Tfbs, that is, a range which is delayed by a predetermined angle Tset which is a crank angle from the expansion stroke injection start timing Tfbs (Step S110). Here, the predetermined angle Tset is determined as a range in which discharge attraction can be generated by the expansion stroke injection and the ignition, that is, a range in which the expansion stroke injection and the ignition can be synchronized with each other, and for example, 3 degrees, 4 degrees, or 5 degrees can be used.

When it is determined in Step S110 that the ignition timing Tp is in the predetermined range, the ignition timing Tp is used without any change and this routine ends. When it is determined that the ignition timing Tp is advanced with respect to the predetermined range, that is, advanced with respect to the timing of the expansion stroke injection start timing Tfbs, the expansion stroke injection start timing Tfbs is set as the ignition timing Tp (Step S120) and this routine ends. When it is determined that the ignition timing Tp is delayed with respect to the predetermined range, that is, delayed with respect to a timing which is delayed by the predetermined angle Tset from the expansion stroke injection start timing Tfbs, the timing which is delayed by the predetermined angle Tset from the expansion stroke injection start timing Tfbs is set as the ignition timing Tp (Step S130), and this routine ends. This process is a process of guarding upper and lower limits of the ignition timing Tp to the predetermined range centered on the expansion stroke injection start timing Tfbs.

Figure 3:
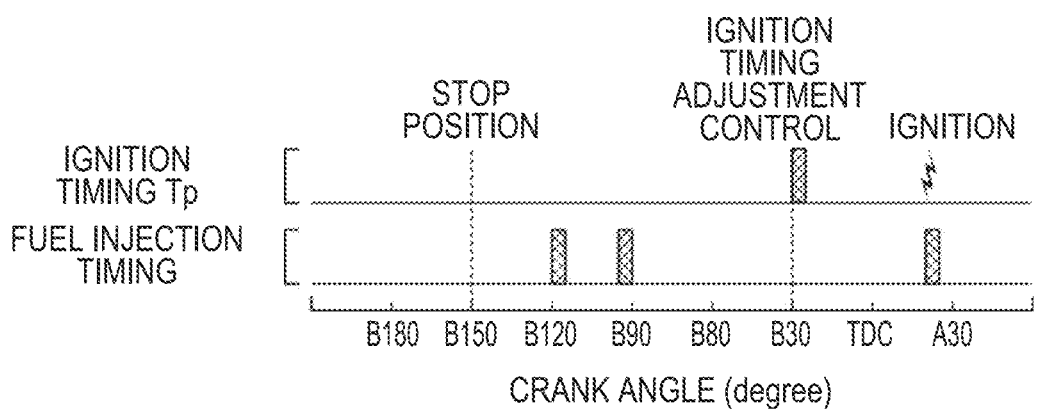
FIG. 3 is a diagram illustrating an example of relationships between an ignition timing Tp, a fuel injection timing, and a crank angle when a stop position is BTDC150 and fuel injection is performed three times in an initially exploded cylinder.

FIG. 3 is a diagram illustrating an example of a relationship between the ignition timing Tp and the fuel injection timing and the crank angle when the stop position is BTDC150 and fuel injection is performed three times in an initially exploded cylinder. In FIG. 3, for example, BTDC30 is abbreviated as B30 and ATDC30 is abbreviated as A30. The target amount of injected fuel Qfd* can be determined based on the charging efficiency KL at BTDC150 which is the stop position and the coolant temperature Tw of the engine 12. Regarding the fuel injection timing, as described above, the first fuel injection start timing is set to BTDC120, the second fuel injection start timing is set to BTDC90, and the expansion stroke injection start timing Tfbs (the final fuel injection start timing) is set to ATDC20. Regarding the ignition timing Tp, the ignition timing adjustment control illustrated in FIG. 2 is performed at the timing of BTDC30, and fuel is ignited at the adjusted ignition timing Tp. By adjusting the ignition timing Tp in this way, discharge attraction can be generated by the expansion stroke injection and the ignition, thereby causing excellent combustion.

In the engine unit 20 according to this embodiment, when the engine 12 explodes fully and the rotation speed Ne of the engine 12 is stabilized, the expansion stroke injection drive transitions to normal drive in which the final fuel injection from the cylinder injection valve 26 is performed up to the compression stroke. At this time, the transition is performed by divided change such that the expansion stroke injection start timing Tfbs and the ignition timing Tp are gradually advanced by a rating process or the like. Accordingly, it is possible to curb sudden change of the torque Te of the engine 12 at the time of transition.

In the aforementioned engine unit 20 according to this embodiment, when the engine 12 is started by the expansion stroke injection drive at the time of restarting of the engine 12 after idling stop, the upper and lower limits of the ignition timing Tp are guarded in the predetermined range centered on the expansion stroke injection start timing Tfbs at the final determination timing of the ignition timing Tp. Accordingly, it is possible to generate discharge attraction using expansion stroke injection and ignition and to cause excellent combustion. As a result, when fuel injection and ignition are performed in an expansion stroke, it is possible to prevent the fuel injection timing and the ignition timing from not being synchronized.

In the engine unit 20 according to this embodiment, the ignition timing Tp is determined using the same parameters as the parameters (the acceleration request history, the shift position Sp, the target torque Te*, the coolant temperature Tw, and the like) which are used to set the fuel injection start timing. Accordingly, it is possible to prevent the ignition timing Tp from departing from the predetermined range centered on the expansion stroke injection start timing Tfbs.

In the engine unit 20 according to this embodiment, when the expansion stroke injection drive transitions to the normal drive in which the final fuel injection from the cylinder injection valve 26 is performed up to the compression stroke, the transition is performed by changing the expansion stroke injection start timing Tfbs and the ignition timing Tp by divided change. Accordingly, it is possible to curb sudden change of the torque Te of the engine 12 at the time of transition.

In the engine unit 20 according to this embodiment, the ignition timing Tp is determined using the same parameters as the parameters which are used to set the fuel injection start timing, but the ignition timing Tp may be determined using parameters other than the parameters which are used to set the fuel injection start timing.

In the engine unit 20 according to this embodiment, the expansion stroke injection start timing Tfbs and the ignition timing Tp are changed by divided change when the expansion stroke injection drive transitions to the normal drive, but such divided change may not be performed.

In the engine unit 20 according to this embodiment, the ignition timing adjustment control is performed when the engine 12 is started by the expansion stroke injection drive at the time of restarting of the engine 12 after idling stop, but the ignition timing adjustment control may be performed when the expansion stroke injection drive is performed at times other than the time of restarting of the engine 12 after idling stop.

In the engine unit 20 according to this embodiment, BTDC30 or the like is used as the final determination timing of the ignition timing Tp, a timing which is a control cycle (a predetermined time) before a scheduled arrival time of the compression top dead center TDC may be used as the final determination timing of the ignition timing Tp.

The engine unit 20 according to this embodiment may be mounted in a vehicle including an automatic transmission in a rear stage or may be mounted in a hybrid vehicle along with a motor that outputs traveling power.

Correspondence between principal elements of the embodiment and principal elements of the present disclosure described in the SUMMARY will be described below. In the embodiment, the engine 12 corresponds to an "engine" and the ECU 70 corresponds to a "control device."

The correspondence between the principal elements in the embodiment and the principal elements of the present disclosure described in the SUMMARY does not limit the elements of the present disclosure described in the SUMMARY, because the embodiment is an example for specifically describing an aspect of the present disclosure described in the SUMMARY. That is, it should be noted that the present disclosure described in the SUMMARY has to be construed based on the description of the SUMMARY and the embodiment is only a specific example of the present disclosure described in the SUMMARY.

While an embodiment of the present disclosure has been described above, the applicable embodiment is not limited to the embodiment and can be modified in various forms without departing from the gist of the present disclosure.

The present disclosure is applicable to the manufacturing industry for engine units.

What is claimed is:

1. An engine unit for a vehicle, the engine unit comprising:
   an engine including
      a cylinder injection valve that is configured to spray fuel into a combustion chamber, and
      an ignition plug that is configured to ignite fuel sprayed from the cylinder injection valve; and
   a control device configured to control a plurality of fuel injections using the cylinder injection valve and ignition using the ignition plug,
   wherein, after separately setting (i) a start timing of expansion stroke injection drive of performing a final fuel injection from the cylinder injection valve in an expansion stroke and (ii) an ignition timing for ignition by the ignition plug, the control device is configured to, in response to the ignition timing being outside a predetermined range, perform ignition timing adjustment control for guarding upper and lower limits of the ignition timing,
   wherein the predetermined range is between the start timing of the expansion stroke injection drive and a delayed timing delayed, by a predetermined crank angle, from the start timing of the expansion stroke injection drive, and wherein, in the ignition timing adjustment control, the control device is configured to, in response to the ignition timing being advanced with respect to the predetermined range, adjust the ignition timing to be the start timing of the expansion stroke injection drive, and in response to the ignition timing being delayed with respect to the predetermined range, adjust the ignition timing to be the delayed timing.

2. The engine unit according to claim 1, wherein the control device is configured to perform the expansion stroke injection drive and the ignition timing adjustment control at a time of restarting of the engine after idling stop.

3. The engine unit according to claim 1, wherein a final determination timing of the ignition timing is a control cycle timing closest to a timing before the compression top dead center.

4. The engine unit according to claim 1, wherein the control device is configured to separately set the start timing of the expansion stroke injection drive and the ignition timing using same parameters.

5. The engine unit according to claim 1, wherein the control device is configured to perform the final fuel injection and advancing of the ignition timing by divided change when the expansion stroke injection drive transitions to normal drive in which the final fuel injection from the cylinder injection valve is performed up to a compression stroke.

* * * * *